United States Patent
Haar et al.

(10) Patent No.: US 11,021,103 B2
(45) Date of Patent: Jun. 1, 2021

(54) METHOD FOR ENRICHING A FIELD OF VIEW OF A DRIVER OF A TRANSPORTATION VEHICLE WITH ADDITIONAL INFORMATION, DEVICE FOR USE IN AN OBSERVER TRANSPORTATION VEHICLE, DEVICE FOR USE IN AN OBJECT, AND TRANSPORTATION VEHICLE

(71) Applicant: VOLKSWAGEN AG, Wolfsburg (DE)

(72) Inventors: Adrian Haar, Wolfsburg (DE); Andro Kleen, Braunschweig (DE); Frederik Schewe, Braunschweig (DE); Robert Jan Wyszka, Hannover (DE); Daniel Gurka, Hannover (DE)

(73) Assignee: Volkswagen AG

( * ) Notice: Subject to any disclaimer, the term of this patent is extended or adjusted under 35 U.S.C. 154(b) by 0 days.

(21) Appl. No.: 16/025,631

(22) Filed: Jul. 2, 2018

(65) Prior Publication Data
US 2019/0001886 A1    Jan. 3, 2019

(30) Foreign Application Priority Data
Jul. 3, 2017    (DE) ...................... 10 2017 211 244.1

(51) Int. Cl.
*B60R 1/00* (2006.01)
*G06K 9/00* (2006.01)
(Continued)

(52) U.S. Cl.
CPC ................ *B60R 1/00* (2013.01); *B60Q 9/008* (2013.01); *G02B 27/0149* (2013.01);
(Continued)

(58) Field of Classification Search
CPC ..... B60Q 9/008; B60R 1/00; B60R 2300/307; B60R 2300/8093; B60W 2050/146;
(Continued)

(56) References Cited

U.S. PATENT DOCUMENTS 5,920,128 A * 7/1999 Hines .................... B60T 8/1708
307/10.8
2010/0292886 A1* 11/2010 Szczerba ............... G01S 13/723
701/31.4

(Continued)

FOREIGN PATENT DOCUMENTS

DE          10131720 A1      1/2003
DE          10257484 A1      7/2004
(Continued)

OTHER PUBLICATIONS

Search Report for European Patent Application No. 18179495.9; dated Dec. 7, 2018.

(Continued)

*Primary Examiner* — Jessica M Prince
(74) *Attorney, Agent, or Firm* — Barnes & Thornburg LLP

(57) ABSTRACT

A method for enhancing a field of view of a driver of a transportation vehicle with supplementary information, in which the supplementary information is depicted via a display unit display. Observation of the surroundings of the transportation vehicle takes place and, in response to the observation of the surroundings having detected a relevant object for which a potential significance arises, the relevant object is depicted on the display unit and the relation to the real object is emphasized in the field of view of the driver by the depicted object being visually highlighted in an environmentally synchronous state with respect to the real object. Also disclosed is an appropriately designed apparatus for use in an observer transportation vehicle, an appropriately designed apparatus for use in an object, and a transportation vehicle.

16 Claims, 6 Drawing Sheets

(51) Int. Cl.

| | | |
|---|---|---|
| *G08G 1/16* | (2006.01) | |
| *G02B 27/01* | (2006.01) | |
| *B60Q 9/00* | (2006.01) | |
| *H04N 7/18* | (2006.01) | |
| *G01C 21/36* | (2006.01) | |
| *B60W 50/14* | (2020.01) | |
| *G05D 1/02* | (2020.01) | |

(52) U.S. Cl.
CPC ......... *G06K 9/00805* (2013.01); *G08G 1/166* (2013.01); *G08G 1/167* (2013.01); *H04N 7/181* (2013.01); *B60R 2300/307* (2013.01); *B60R 2300/8093* (2013.01); *B60W 2050/146* (2013.01); *G01C 21/365* (2013.01); *G02B 2027/0165* (2013.01); *G05D 1/0246* (2013.01); *G05D 1/0257* (2013.01); *G06K 9/00671* (2013.01)

(58) Field of Classification Search
CPC .......... G01C 21/365; G02B 2027/0165; G02B 27/0149; G05D 1/0246; G05D 1/0257; G06K 9/00671; G06K 9/00805; G08G 1/166; G08G 1/167; H04N 7/181
See application file for complete search history.

(56) References Cited

U.S. PATENT DOCUMENTS

| | | | | |
|---|---|---|---|---|
| 2011/0106444 | A1* | 5/2011 | Adachi | G08G 1/096758 701/532 |
| 2012/0212320 | A1* | 8/2012 | Oberholtzer | B60Q 1/52 340/3.2 |
| 2014/0285666 | A1* | 9/2014 | O'Connell | B60R 1/12 348/148 |
| 2017/0174261 | A1* | 6/2017 | Micks | B62D 15/0265 |
| 2018/0253609 | A1* | 9/2018 | Potter | B60Q 1/2603 |

FOREIGN PATENT DOCUMENTS

| | | |
|---|---|---|
| DE | 10315741 A1 | 11/2004 |
| DE | 10347213 A1 | 5/2005 |
| DE | 102008046038 A1 | 3/2009 |
| DE | 112009004342 T5 | 6/2012 |
| DE | 102012002149 B3 | 6/2013 |
| DE | 102012000949 A1 | 7/2013 |
| DE | 102014000935 A1 | 7/2015 |
| DE | 102015202095 A1 | 8/2016 |

OTHER PUBLICATIONS

Search Report for German Patent Application No. 10 2017 211 244.1; dated Jan. 11, 2018.

\* cited by examiner

METHOD FOR ENRICHING A FIELD OF VIEW OF A DRIVER OF A TRANSPORTATION VEHICLE WITH ADDITIONAL INFORMATION, DEVICE FOR USE IN AN OBSERVER TRANSPORTATION VEHICLE, DEVICE FOR USE IN AN OBJECT, AND TRANSPORTATION VEHICLE

PRIORITY CLAIM

This patent application claims priority to German Patent Application No. 10 2017 211 244.1, filed 3 Jul. 2017, the disclosure of which is incorporated herein by reference in its entirety.

SUMMARY

Illustrative embodiments relate to the technical field of driver information systems, which are also known by the term "infotainment system." Illustrative embodiments relate to a method for enhancing a field of view of a driver of a transportation vehicle with supplementary information. Such systems are used primarily in transportation vehicles. Illustrative embodiments additionally relate to an appropriately designed apparatus for use in an observer transportation vehicle and to an appropriately designed apparatus for use in an object, and also to a transportation vehicle.

BRIEF DESCRIPTION OF THE DRAWINGS

An exemplary embodiment is depicted in the drawings and is explained in more detail below with reference to the figures, in which.

DETAILED DESCRIPTION

Figure 1:
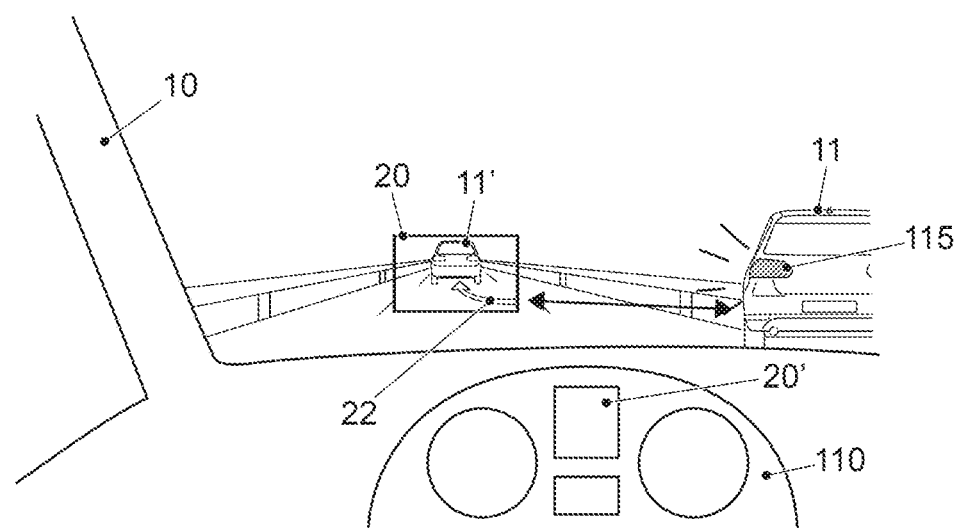
FIG. 1 shows the field of view of the driver of a transportation vehicle while traveling.

At present, intensive work is being done on technologies that are later supposed to allow autonomous driving. A first approach in this case is not to completely relieve the driver of his tasks, but rather the driver can take control of the transportation vehicle at any time and moreover performs monitoring functions. Relatively new technologies in the field of driver information systems such as head-up display HUD allow the driver to be better informed about what is going on in the surroundings of his transportation vehicle. Other displays are also used for this purpose, for example, a user programmable combination instrument positioned in the dashboard.

For the near future, it can, therefore, be assumed that comprehensive information about objects (in particular, transportation vehicles) in the direct surroundings of the ego transportation vehicle will be available on the system through the use of relatively new technologies (vehicle-to-vehicle communication, use of databases, transportation vehicle sensors, etc.). In the transportation vehicle sensors domain, the following components are cited that allow observation of the surroundings: RADAR devices, accordingly Radio Detection and Ranging, LIDAR devices, accordingly Light Detection and Ranging, principally for the distance sensing/warning domain, and cameras having appropriate image processing for the object detection domain. These data about the surroundings can therefore be used as a basis for system-based driving recommendations, warnings, etc. By way of example, displays/warnings about the direction (possibly one's own trajectory) in which another transportation vehicle, in the surroundings, wants to turn are thus conceivable.

Vehicle-to-vehicle communication is now also possible by mobile communication using systems such as LTE, accordingly Long Term Evolution. In this context, the organization 3GPP has adopted a specification called LTE V2X. As an alternative, systems based on WLAN technology are available for transportation vehicle direct communication, in particular, the system based on WLAN p.

The term "autonomous driving" is used differently in the literature in some cases.

To clarify this term, the following insert is therefore also presented here. Autonomous driving (sometimes also called automatic driving, automated driving or piloted driving) is understood to mean the movement of transportation vehicles, mobile robots and driverless transport systems that behave largely autonomously. There are various levels for the term autonomous driving. On particular levels, reference is made to autonomous driving even if there is still a driver in the transportation vehicle, who possibly then only undertakes monitoring of the automatic driving process. In Europe, the various ministries of transport (in Germany, the Federal Highway Research Institute was involved) have cooperated and defined the following levels of autonomy:

Level 0: "Driver only"; the driver drives himself, steers, accelerates, brakes, etc.

Level 1: Particular assistance systems assist in transportation vehicle operation (inter alia an automatic cruise control system—ACC).

Level 2: Semiautomation. Inter alia automatic parking, lane-keeping function, general longitudinal guidance, acceleration, slowing down etc. are undertaken by the assistance systems (inter alia queue assistant).

Level 3: High-level automation. The driver does not need to monitor the system constantly. The transportation vehicle independently performs functions such as triggering the turn signal indicator, changing lane and keeping in lane. The driver can address other things, but is asked by the system to take charge when required within an early warning time. This form of autonomy is technically feasible on freeways. The legislative body is working toward licensing level 3 transportation vehicles. The legal context has already been provided therefor.

Level 4: Full automation. The running of the transportation vehicle is permanently undertaken by the system. If the driving tasks are no longer managed by the system, the driver can be asked to take charge.

Level 5: No driver required. Apart from stipulating the destination and starting the system, no human intervention is required.

Automated driving functions from level 3 onward remove the responsibility for controlling the transportation vehicle from the driver.

On the basis of the current development toward higher levels of autonomy, where many transportation vehicles still continue to be controlled by the driver, however, it can be assumed that applicable additional information can already be used for manually controlled transportation vehicles in the medium term, and not only for highly automated systems in the long term.

For the driver-vehicle interaction, the question arises in this case as to how this information can be depicted such that real added value is produced for the human driver and he can also quickly, and intuitively, locate the information provided. The following solutions in this domain are already known from the prior art.

DE 10 2008 046 038 A1 discloses an image display apparatus that displays a virtual image by projecting an image on to a windshield of a transportation vehicle. Additionally, an obstacle detector is included that senses an obstacle situated around the transportation vehicle. A safety determination unit is present that determines a safety of the transportation vehicle in regard to the sensed obstacle on the basis of a distance from the obstacle and/or a relative speed of the transportation vehicle in relation to the obstacle. The display apparatus further has an image control unit that controls a position of the virtual image such that the image circles the obstacle in a field of view of a driver if the safety determination unit determines that the obstacle is a risk to driving safety.

DE 10 2012 000 949 A1 discloses a method that is used to warn the driver of a transportation vehicle about a risk of collision. In this case, a temporal sequence of images of a surrounding area of the transportation vehicle is recorded by a camera of a collision warning system, and a further transportation vehicle in the surrounding area is detected in the recorded images by a computation device of the collision warning system. On the basis of the temporal sequence of images, the computation device is used to determine a current state of at least one illuminant of the further transportation vehicle. On the basis of the current state of the illuminant, the computation device then decides whether or not the driver needs to be warned.

DE 10 2015 202 095 A1 discloses a method for predicting the behavior of at least one transportation vehicle traveling ahead. A driver of the ego transportation vehicle can be warned or informed, e.g., by a notification on an instrument or on a head-up display of the ego transportation vehicle or by an audible warning signal or a haptic warning signal (e.g., vibration of the steering wheel, vibration of the brake, etc.) or by a combination of these, in particular, before the transportation vehicle driving ahead possibly merges into the lane. A prediction unit computes a particular probability of the transportation vehicle traveling ahead merging into the lane and issues the warning or even slows down in the event of certain values being exceeded.

The known solutions have the problem that the additional displays (HUD or combination instrument) are physically limited. From the point of view of the driver, they cover only a small portion of his field of view, which is why visual linking of depicted information to corresponding, interacting road users is not always immediately possible. On the display, the aforementioned technologies for observing the surroundings can already be used today to depict the direction in which a transportation vehicle wants to turn. Precisely which transportation vehicle it is from the point of view of the driver, however, cannot be immediately visualized, depending on the position of this transportation vehicle. FIG. 1 illustrates this problem.

Disclosed embodiments determine how a connection between the display and the corresponding object in the environment that is intuitively comprehensible for the driver can nevertheless be provided.

Disclosed embodiments provide a method for enhancing a field of view of a driver of a transportation vehicle with supplementary information, an apparatus for use in an observer transportation vehicle, an apparatus for use in an object and a transportation vehicle.

The proposal relates to a method for enhancing the field of view of a driver of a transportation vehicle with supplementary information, in which the supplementary information is depicted via a display unit, in particular, a head-up display. The method involves observation of the surroundings of the transportation vehicle taking place. If the observation of the surroundings has detected a relevant object with a potential significance, the relevant object is depicted on the display unit and the relation to the real object is emphasized in the field of view of the driver by virtue of the depicted object being visually highlighted in an environmentally synchronous state with respect to the real object.

The basic concept of the environmentally synchronous highlighting of elements in this case is to adapt the elements displayed on the display unit in respect of depiction frequencies/clock rates for the environment (lights and displays on other transportation vehicles or infrastructures). Consequently, the supplementary information displayed in the transportation vehicle is emphasized at the same, synchronous frequency as the applicable object (lights and displays on other transportation vehicles, infrastructures or the like) in the environment is visible to the transportation vehicle driver. The environmentally synchronous display of HUD content clarifies the link to the corresponding object in the surroundings of the transportation vehicle. It becomes intuitively clear to the driver to which object in the transportation vehicle surroundings the supplementary information displayed on the HUD relates.

In the frequent case in which the relevant object detected by the observation of the surroundings relates to a transportation vehicle, and the transportation vehicle uses an activated flashing turn signal light to announce that there is the intention to change lane, it is beneficial if the depicted object is likewise depicted in a flashing state, the flash process optionally taking place in sync with the flash process of the real object.

Additionally, it is beneficial if a trajectory, previously computed by the observation of the surroundings, for the relevant object is depicted on the display unit. This can be done for a transportation vehicle as a turn-off or turn-in arrow or in another form.

In this case, further emphasis can be provided by virtue of the depicted trajectory also being depicted in a synchronously flashing state, or instead of the depicted object the depicted trajectory of the object being depicted in a synchronously flashing state.

To realize the observation of the surroundings, it is beneficial if one or more cameras and/or a RADAR or LIDAR sensor, which record a sequence of images, are used therefor and object detection is performed for the recorded images. It is possible for current methods for object detection by various algorithms for image evaluation to be used that are able to be realized using microcomputers, e.g., in an onboard computer of the transportation vehicle.

In this context, it is beneficial if the algorithms for image evaluation evaluate a number of images to ascertain the flash rate and/or phase for a detected flashing/pulsating object. This is beneficial for general flashing or pulsating objects, including infrastructure objects, for which the flash rate is not stipulated, of which a variable flash rate is possible.

In the case of the environmentally synchronous depiction, it is beneficial if the depicted objects are depicted in a differently pulsating or a differently emphasized state instead of completely in a flashing state. Pulsating in this case can mean that the objects are depicted light and dark in alternation or the color changes or the size changes alternately, etc. There are a wide variety of possibilities for the depiction in this case.

The different emphasis can also be that a symbol or a pictogram for the depicted object is depicted in a flashing or pulsating state.

For the method, it may also be beneficial if the flash rate and/or the phase of the flash process for the detected transportation vehicle is communicated to the observer transportation vehicle via a vehicle-to-vehicle communication in one or more environment synchronization messages. In that case, the image evaluation is simplified and it is then only necessary for object detection to take place.

An important special case is also that the detected object is a live animal or another object at the edge of the road lighting of its own or a flashing light. In that case, the real object is visually emphasized by virtue of the object being illuminated in a flashing or pulsating state by a lighting device of the transportation vehicle. This allows the environmentally synchronous depiction of such objects.

For an apparatus for use in an observer transportation vehicle with the method, it is beneficial that a display unit on which the supplementary information is supposed to be depicted is provided, and one or more cameras or a RADAR or LIDAR sensor for observing the surroundings, and also a computation unit for evaluating a number of camera images for object detection and for displaying the detected object on the display unit if it has been established that the detected object is of potential significance. In this case, the computation unit computes the display such that the relation to the real object is emphasized in the field of view of the driver by virtue of the depicted object being visually highlighted in an environmentally synchronous state with respect to the real object.

It is additionally beneficial if the apparatus has a communication module via which the flash rate and/or the phase of the flash process for the detected object is communicated to the apparatus via a vehicle-to-vehicle communication in one or more environment synchronization messages. This simplifies the image evaluation in the observer transportation vehicle, which means that now only object detection needs to take place.

A beneficial measure is also that the apparatus actuates a lighting apparatus to cause visual emphasis of the real object by virtue of the object being illuminated in a flashing or pulsating state by the lighting apparatus. This is beneficial if the detected object is a live animal or an object without flashing lighting or a corresponding display panel.

For an apparatus for use in an object with the disclosed method, the following applies: if the object is equipped with a flashing light or a display unit and with a communication module and a computation unit, it is beneficial if the computation unit is designed such that it environmentally synchronously highlights the object depicted in an observer transportation vehicle by sending one or more environment synchronization messages to the observer transportation vehicle, in which it communicates the flash rate and/or the phase of the flash process of the lighting or of the display unit of the object.

The present description illustrates the principles of the disclosed embodiments. It is therefore self-evident that persons skilled in the art will be capable of designing various arrangements that, although not described explicitly here, embody principles of the disclosed embodiments and are likewise supposed to have their scope protected.

FIG. 1 shows the field of view of the driver of a transportation vehicle 10 who is sitting in the cockpit of the transportation vehicle 10 and controls the transportation vehicle. As an example, the transportation vehicle 10 is a passenger transportation vehicle. The driving situation depicted is consistent with the typical situation when traveling on a highway or freeway where another transportation vehicle 11 is traveling in the acceleration lane of the road and the driver of the other transportation vehicle wishes to join the highway or freeway. The other transportation vehicle 11 is likewise a passenger transportation vehicle. The driver of the other transportation vehicle 11 indicates his desire to join by turning on the direction of travel indicator, in this case for the left-hand side of the transportation vehicle. The direction of travel indicator is referred to as a turn signal indicator or flashing turn signal light for short below. The flashing turn signal light is provided with the reference number 115 in FIG. 1.

In the field of view of the driver of the transportation vehicle 10, there is already the other transportation vehicle 11, which is still on the move in the acceleration lane to the right next to the transportation vehicle's own lane. The lit phase of the flashing turn signal light is indicated by applicable rays of light in FIG. 1. The field of view of the driver of the transportation vehicle 10 also contains the combination instrument 110 that is fitted in the dashboard of the transportation vehicle. The transportation vehicle 10 is equipped with a head-up display HUD. This produces an image that is projected on to the windshield of the transportation vehicle 10. The image is projected such that it is perceived by the driver as though the image were projected on to a screen a few meters in front of the transportation vehicle. In this case, the projected image appears semi-transparent. The driver thus still sees what is happening in the region of the image on the road.

The image shows a depiction of the transportation vehicle 11 traveling ahead. It likewise depicts a trajectory 22. The trajectory 22 is consistent with a turn-off or turn-in arrow, as is also known from applicable displays of navigation systems. The display of the depicted transportation vehicle 11' and of the trajectory 22 is supposed to indicate to the driver that he can prepare himself for a transportation vehicle to be about to cross his path and thus appropriate caution is demanded. With this form of depiction, however, in particular, if multiple transportation vehicles are in the field of view, it is not quite evident to the driver which transportation vehicle is meant by trajectory 22. What is missing is a visual link from the depicted transportation vehicle 11' to a transportation vehicle 11 that appears in the field of view. Instead of the display of the supplementary information only by the HUD 20, it is alternatively or additionally possible for the supplementary information to be displayed on a display unit 22' of the combination instrument.

Figure 2:
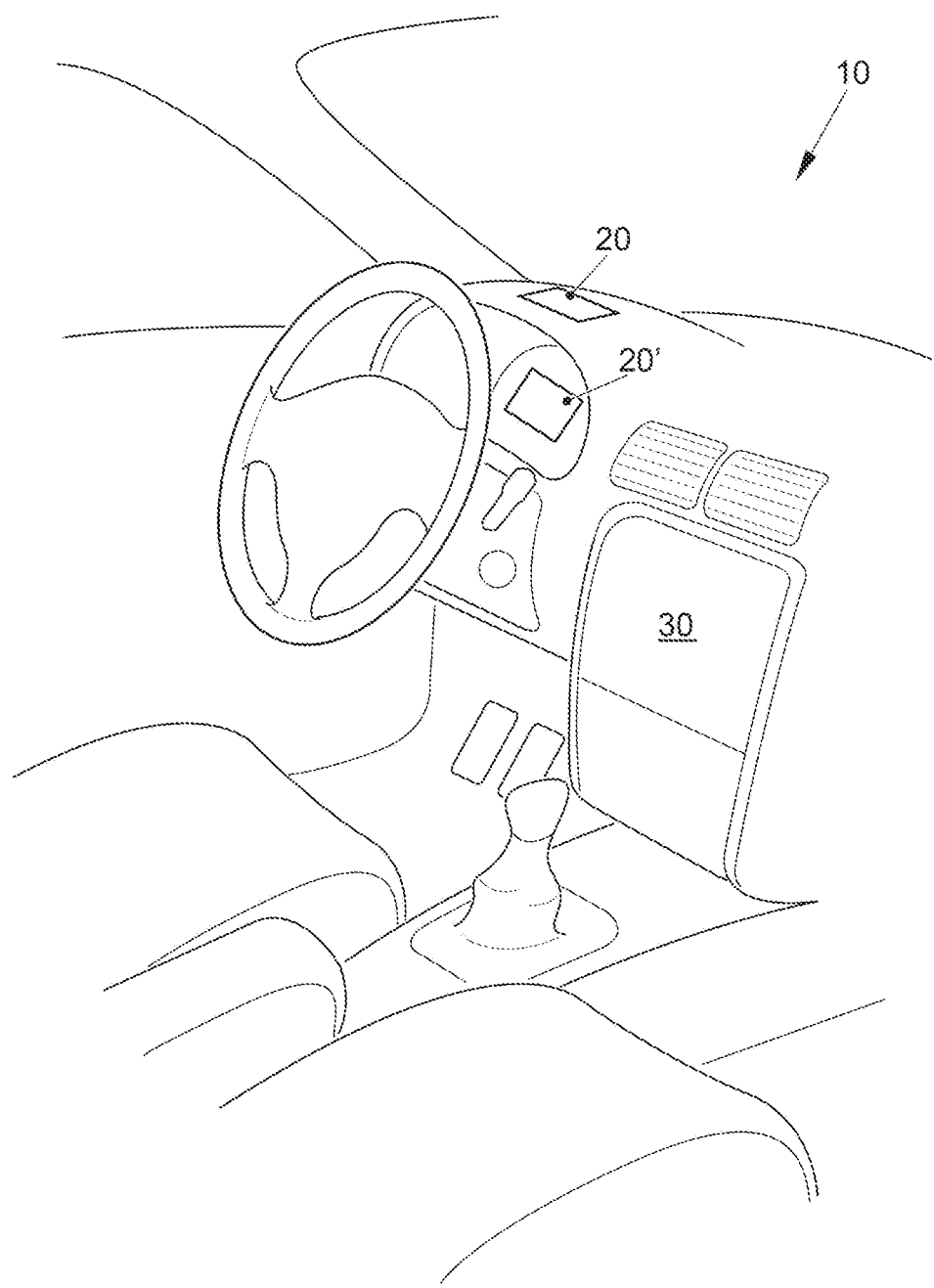
FIG. 2 shows the cockpit of a transportation vehicle with various display units as part of an infotainment system.

FIG. 2 shows the cockpit of the transportation vehicle 10. It depicts a passenger transportation vehicle. A suitable transportation vehicle would also be any other transportation vehicles, however. Examples of further transportation vehicles are: buses, commercial transportation vehicles, in particular, trucks, agricultural machines, construction machines, motorcycles, rail transportation vehicles, etc. Use of the disclosed embodiments would be generally applicable for agricultural transportation vehicles, rail transportation vehicles, watercraft and aircraft.

In the cockpit, three display units of an infotainment system are depicted. These are the head-up display 20, the supplementary display unit 20' of the combination instrument 110 and a touch sensitive screen 30 fitted in the central console. While traveling, the central console is not in the field of view of the driver. Therefore, the supplementary information is not displayed on the display unit 30 while traveling.

The touch sensitive screen 30 is used in this case for the operator control of functions of the transportation vehicle 10. By way of example, it can be used to control a radio, a navigation system, reproduction of stored pieces of music and/or an air conditioning system, other electronic devices or other convenience functions or applications of the transportation vehicle 10. In summary, reference is frequently made to an "infotainment system". In transportation vehicles, specifically passenger transportation vehicles, an infotainment system denotes the combination of car radio, navigation system, hands-free device, driver assistance systems and further functions in a central operator control unit. The term infotainment is a portmanteau word made up of the words information and entertainment. The apparatus for operator control of an infotainment system has a display device, such as, the touch sensitive screen 30, also referred to as a "touchscreen", in the region of a central console of the transportation vehicle 10, this screen 30 being able to be easily seen and controlled by a driver of the transportation vehicle 10 but also by a front-seat passenger of the transportation vehicle 10. Arranged below the screen 30, there may also be mechanical operator control elements, for example, keys, rotary controls or combinations of these, such as rotary push controls, for example.

Figure 3:
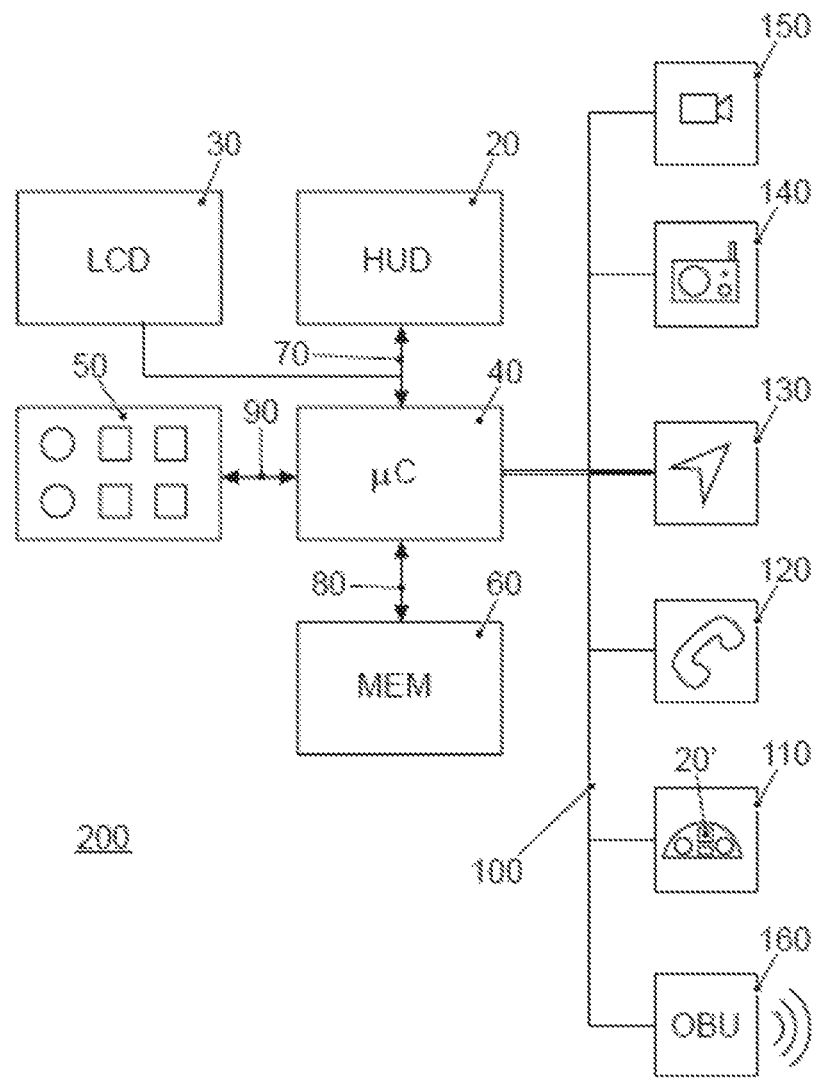
FIG. 3 shows the block diagram of the infotainment system of the transportation vehicle.

FIG. 3 schematically shows a block diagram of the infotainment system 200 and, by way of example, a few subsystems or applications of the infotainment system. The operator control apparatus comprises the touch sensitive display unit 30, a computation device 40, an input unit 50 and a memory 60. The display unit 30 comprises both a display panel for displaying variable graphical information and a user interface (touch sensitive layer), arranged above the display panel, for the input of commands by a user.

The display unit 30 is connected to the computation device 40 via a data line 70. The data line may be designed on the basis of the LVDS standard, accordingly low voltage differential signaling. Via the data line 70, the display unit 30 receives control data for actuating the display panel of the touchscreen 30 from the computation device 40. Via the data line 70, control data of the input commands are also transmitted from the touchscreen 30 to the computation device 40. The reference numeral 50 denotes an input unit. Associated with this are the aforementioned operator control elements such as keys, rotary controls, slider controls or rotary push controls, which the operator can use to make inputs via the menu guidance. An input is generally understood to mean the callup of a selected menu option, and the changing of a parameter, the switching of a function on and off, etc.

The memory device 60 is connected to the computation device 40 via a data line 80. The memory 60 stores a pictogram directory and/or symbol directory, with the pictograms and/or symbols for the possible displays of supplementary information.

The further parts of the infotainment system, camera 150, radio 140, navigation appliance 130, telephone 120 and combination instrument 110, are connected to the apparatus for operator control of the infotainment system via the databus 100. A suitable databus 100 is the high speed option of the CAN bus based on ISO standard 11898-2. Alternatively, it would, e.g., also be possible to use a bus system based on Ethernet technology, such as BroadR-Reach. Bus systems in which the data transmission takes place via optical fibers can also be used. Cited examples are the MOST (Media Oriented System Transport) bus or the D2B (Domestic Digital Bus) bus. It is also mentioned at this juncture that the camera 150 may be designed as a conventional video camera. In this case, it records 25 frames/s, which corresponds to 50 fields/s in the interlace recording mode.

Alternatively, a special camera can be used that records more frames/s, to increase the accuracy of the object detection for more quickly moving objects. It is possible for multiple cameras to be used for observing surroundings. At the same time, the aforementioned RADAR or LIDAR systems can also be used additionally or alternatively, to perform or extend the observation of the surroundings. For wireless communication inward and outward, the transportation vehicle 10 is equipped with a communication module 160. This module is often also referred to as an onboard unit. It may be designed for mobile radio communication, e.g., based on the LTE standard. Similarly, it may be designed for WLAN communication, whether for communication with devices of the occupants in the transportation vehicle or for vehicle-to-vehicle communication, etc.

The disclosed method for displaying supplementary information in the field of view of the driver is explained below with reference to two exemplary embodiments.

For the remainder of the figures, it holds that the same reference numerals denote the same fields and symbols as explained for the description of FIGS. 1 to 3.

Figure 4:
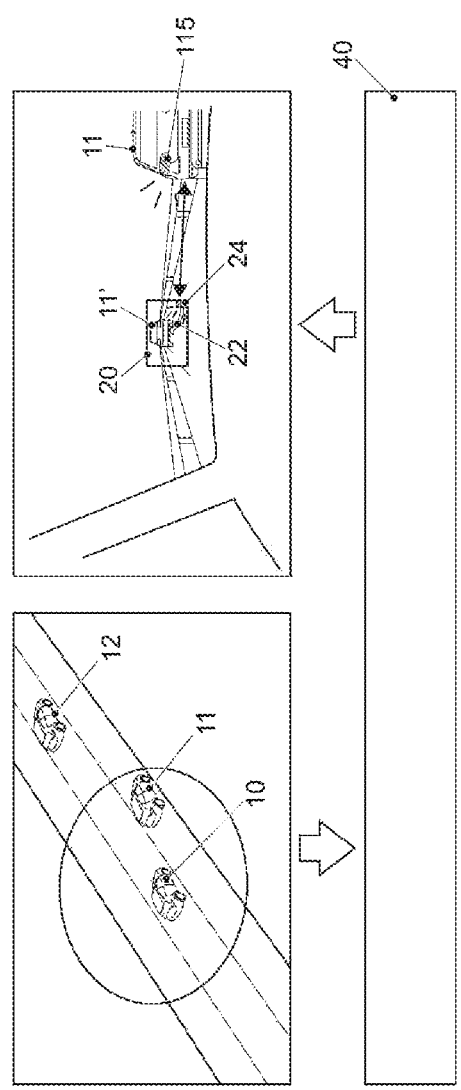
FIG. 4 shows a first example of observation of surroundings of the transportation vehicle and the resultant display of supplementary information using a head-up display unit of the infotainment system.

The top left-hand part of FIG. 4 depicts the driving situation already described for FIG. 1 from above. The transportation vehicle 10 moving in a lane of the highway or freeway is equipped with camera 150, RADAR or LIDAR system, and performs observation of the surroundings, as indicated by the circle around the transportation vehicle 10. To the right of the transportation vehicle 10, the transportation vehicle 11 is moving in the acceleration lane. In front of the observer transportation vehicle 10, a further transportation vehicle 12 is moving in the same lane. The bottom part of the image depicts the computation unit 40. The data generated by the sensors for observing the surroundings are delivered to the computation unit 40 and evaluated therein.

The frequency and phase of the flash process for the detected transportation vehicle 11 is also evaluated in the computation unit 40. This is possible by image processing. The interval of time between 2 frames on which the lit phase can be seen can be ascertained in the recorded video sequence. This results in the frequency. To simplify this process, approximate values can also be used. The flash rate is standardized for transportation vehicles. It is between 0.8 and 1.25 Hz. This may be preset in the computation unit 40. It is then only necessary to ascertain the correct phase.

As the result of the evaluation, applicable supplementary information is displayed on the head-up display 20. The resulting display is shown in the right-hand part of FIG. 4. The HUD depicts a transportation vehicle 11'. This may either be an applicable pictogram for a passenger transportation vehicle or is a scaled image recorded by the camera 150 or a symbol. As a further element, the HUD display 20 displays the trajectory 22. In addition, there is a flashing element 24. Various embodiments are possible in this case. In one form, it is simply possible for rays of light in a color corresponding to typical flashing turn signal lights to be displayed. In another form, either the trajectory 22 or the depicted transportation vehicle 11 or both or alternately both is/are depicted flashing. This form of depiction produces a visual link by the real flash process for the transportation vehicle 11 in the field of view and the synchronously flashing depiction on the HUD 20. This form of depiction is also referred to as environmentally synchronous visual highlighting/linking in this case.

The synchronization with flashing lights appears effective in this connection, which is why the instance of application of a display in sync with direction of travel indicators/turn signal indicators is depicted below. The synchronous (pulsating/flashing) display of HUD elements (or displays in general) on the basis of active sensing of the direction of travel indicator/flashing light of another transportation vehicle is therefore the prototypical instance of application. Generally, however, the system can be transferred to any object able to be sensed having a depiction frequency perceptible to human beings (traffic lights, blue light, parking guidance systems, etc.). The display in sync with the "flashing" of a transportation vehicle in the surroundings makes it easier for the driver to link the HUD content (or displays in general) and the corresponding transportation vehicle. It becomes clear to the transportation vehicle driver to which transportation vehicle the depiction in his HUD or his display relates. FIG. 3 shows an applicable example.

The display elements do not necessarily have to appear and disappear completely in time with the reference object in this case, but rather can also pulsate or be emphasized differently (size, color, brightness, etc.) only slightly. Whether the depicted display elements themselves take on the timing/frequency or whether proximate elements (in the HUD or in the transportation vehicle interior) take on the frequency is likewise variable.

Figure 5:
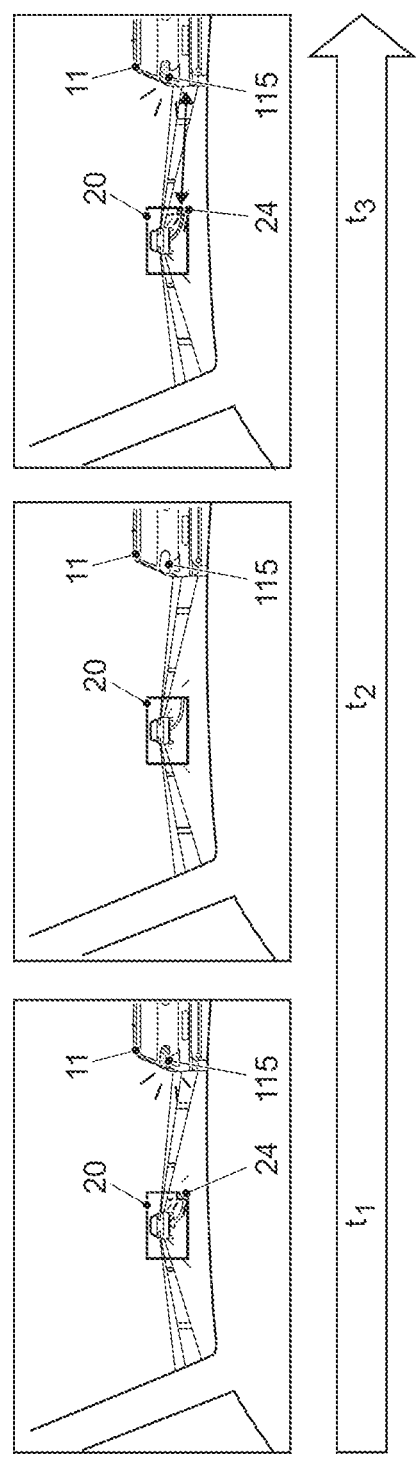
FIG. 5 shows an example of the time profile of an environmentally synchronous depiction of a detected transportation vehicle traveling ahead using the head-up display unit.

FIG. 5 now shows the timing of the environmentally synchronous depiction on the HUD 20. The timeline is depicted in the lower part of the image. In the top left-hand image, the field of view of the driver of the transportation vehicle 10 at a first time t1 is depicted. There, it can be seen that the flashing turn signal light 115 of the transportation vehicle 11 is lit. At the same time, the flashing element 24 on the HUD 20 is lit. In the top center image, the field of view of the driver in the subsequent phase at a time t2 is shown, in which the flashing light 115 is not lit. Accordingly, the flashing element 24 on the HUD 20 is not shown. In the top right-hand image, the field of view of the driver of the transportation vehicle 10 at a third time t3 is depicted. It holds that t3>t2>t1. There, it can be seen that the flashing turn signal light 115 of the transportation vehicle 11 is lit again. At the same time, the flashing element 24 is also displayed on the HUD 20 again.

The display of HUD content in sync with the flashing turn signal light 115 clarifies the link to the corresponding transportation vehicle 11. It becomes clear to the driver that the trajectory 22 depicted on his HUD 20 relates to the flashing transportation vehicle 11 next to him.

Figure 6:
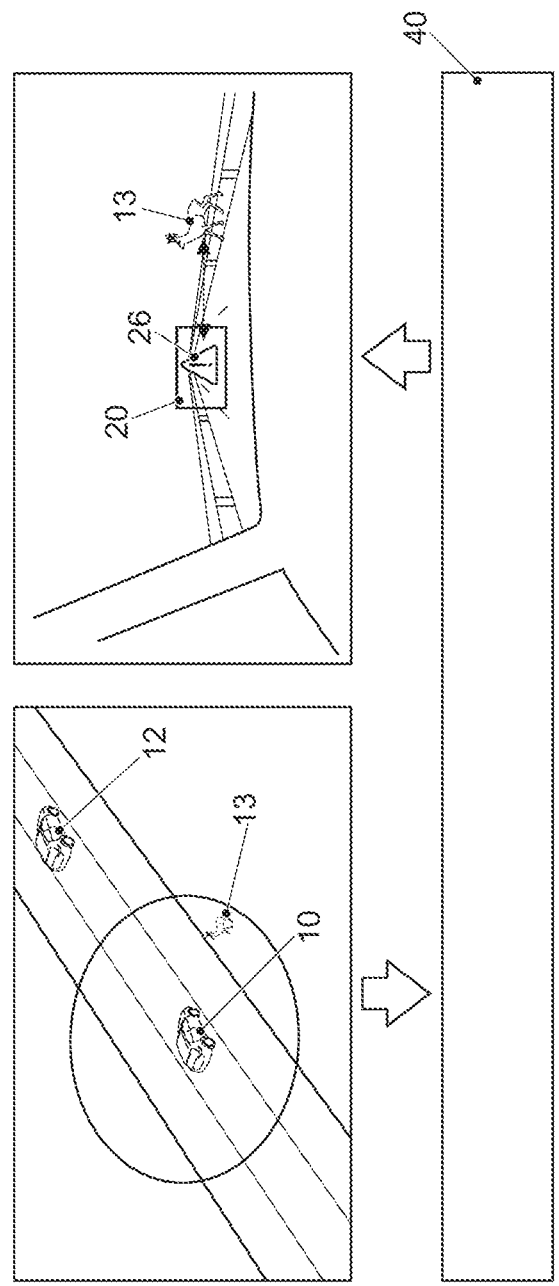
FIG. 6 shows a second example of observation of surroundings of the transportation vehicle and the resultant display of supplementary information using the head-up display unit of the infotainment system.

In FIG. 6, it is now also possible to see a second exemplary embodiment of environmentally synchronous highlighting of image content. The top left-hand image shows a driving situation where the transportation vehicle 10 is moving in its lane. At the right-hand edge of the road there is a deer 13 that is detected by the observation of the surroundings of the transportation vehicle 10. The computation unit 40 performs evaluation of the object detection and classifies the deer 13 as a potential risk. It produces a warning that is displayed on the HUD 20. In the case shown, the appearance of the warning is that a warning symbol 13' is displayed. To make the reference to the detected object 13, the warning is depicted in a pulsating state. Since animals frequently stand at the edge of the road in the dark, the right-hand edge of the road is lit in a pulsating state by the lighting device of the transportation vehicle in this embodiment. This can be done, e.g., using the cornering lights. Modern transportation vehicles today are often equipped with matrix LED lamps. Specific segments of this matrix lamp can be provided for lighting the object at the edge of the road. The pulsating of the warning symbol 13' takes place in sync with the pulsating lighting of the deer 13 to make the reference from the warning to the real object.

In summary, it is also mentioned at this juncture that the method involves three components interacting, which are depicted in FIG. 3. First, the observation of the surroundings with camera 150 and the computation unit 40, which has to sense or be provided with the frequencies of the reference objects in the environment. On the basis of that, it is then possible for the computation unit 40 to offset the supplementary information against the frequency data and actuate applicable display elements 20, 20'. The display elements 20, 20' need to allow synchronous depiction or visual emphasis of content, this being provided for the display units based on LCD, OLED panels, and also other matrix displays.

It is also pointed out that the detected relevant objects in the environment that are mentioned in the exemplary embodiments (transportation vehicle 11 and animal (deer) 13) are only two examples of many possible objects.

The object detection may be designed for many different objects. Further cited examples are beacons erected or permanently installed at the edge of the road that are provided with warning lamps, erected warning lamps or warning signs, trucks, police vehicles, fire service vehicles, ambulances, heavy transport, buses, agricultural vehicles, construction machines, bicycles, motorcycles, scooters or pedestrians. For trucks, it is planned for the future that they will be equipped with display panels.

All the examples and conditional formulations mentioned herein are intended to be understood without limitation to specifically listed examples of this kind. As such, for example, persons skilled in the art will recognize that the block diagram depicted here is a conceptual view of an exemplary circuit arrangement. Similarly, it can be seen that a depicted flowchart, state transition diagram, pseudocode and the like are different options for presenting processes that are essentially stored in computer-readable media and can therefore be executed by a computer or processor.

It should be understood that the proposed method and the associated apparatuses can be implemented in various forms of hardware, software, firmware, special processors or a combination thereof. Special processors may comprise application-specific integrated circuits (ASICs), a reduced instruction set computer (RISC) and/or field programmable gate arrays (FPGAs). Optionally, the proposed method and the apparatus are implemented as a combination of hardware and software. The software may be installed as an application program on a program memory device. Typically, this is a machine based on a computer platform that comprises hardware such as, for example, one or more central processing units (CPUs), a random access memory (RAM) and one or more input/output (I/O) interface(s).

In addition, an operating system is typically installed on the computer platform. The various processes and functions described here may be part of the application program, or a part that is executed by the operating system.

The disclosure is not restricted to the exemplary embodiments described here. There is latitude for various adaptations and modifications that a person skilled in the art, on the basis of his specialist knowledge, would take into consideration as also belonging to the disclosure.

LIST OF REFERENCE SYMBOLS 10 observer transportation vehicle
11 transportation vehicle
12 transportation vehicle traveling ahead
13 detected object
13' warning symbol
20 head-up display HUD
20' display unit
22 trajectory
24 flashing element
30 touch sensitive display unit
40 computation unit
50 input unit
60 memory unit
70 data line to the display unit
80 data line to the memory unit
90 data line to the input unit
100 databus
110 combination instrument
115 flashing turn signal indicator
120 telephone
130 navigation appliance
140 radio
150 camera
160 communication module
200 infotainment system

The invention claimed is:

1. An apparatus for use in an observer transportation vehicle for enhancing a field of view of a driver of the observer transportation vehicle with supplementary information, the apparatus comprising:
a display unit upon which supplementary information is depicted;
one or more cameras or a RADAR or LIDAR sensor for observing surroundings of the transportation vehicle; and
a computation unit for evaluating a number of recorded images for object detection and for computing a display of the detected object on the display unit in response to establishment that the detected object is of potential significance,
wherein the computation unit computes a trajectory for the detected object,
wherein the computation unit computes the display to emphasize a relation to a transportation vehicle, using an activated flashing turn signal light to announce an intention to change lane, in the field of view of the driver by a depicted object being visually highlighted by flashing in synchronization with the activated flashing turn signal light of the transportation vehicle, and
wherein the trajectory of the detected object is indicated in the field of view of the driver in connection with the depicted object.

2. The apparatus of claim 1, further comprising a communication module via which a flash rate or a phase of a flash process for the detected object is communicated to the apparatus via vehicle-to-vehicle communication in one or more environment synchronization messages.

3. The apparatus of claim 1, further comprising a lighting apparatus that, in response to the detected object being a live animal or an object without an actuatable display unit or actuatable flashing light, causes visual emphasis of the detected object in response to the detected object being illuminated in a flashing or pulsating state by the lighting apparatus.

4. The apparatus of claim 1, further comprising a flashing light and a communication module, wherein the computation unit environmentally synchronously highlights the object depicted in the observer transportation vehicle by sending one or more environment synchronization messages to the observer transportation vehicle, in which the computation unit communicates a flash rate or a phase of a flash process of a lighting or of the display unit of the object to the observer transportation vehicle.

5. A transportation vehicle, comprising an apparatus for enhancing a field of view of the driver of the transportation vehicle with supplementary information, the apparatus comprising:
a display unit upon which supplementary information is depicted;
one or more cameras or a RADAR or LIDAR sensor for observing surroundings of the transportation vehicle; and
a computation unit for evaluating a number of recorded images for object detection and for computing a display of the detected object on the display unit in response to establishment that the detected object is of potential significance,
wherein the computation unit computes a trajectory for the detected object,
wherein the computation unit computes data for the display to emphasize a relation to a transportation vehicle, using an activated flashing turn signal light to announce an intention to change lane, in the field of view of the driver by a depicted object being visually highlighted by flashing in synchronization with the activated flashing turn signal light of the transportation vehicle, and
wherein the trajectory of the detected object is indicated in the field of view of the driver in connection with the depicted object.

6. The transportation vehicle of claim 5, wherein the apparatus further comprises a communication module via which a flash rate or a phase of the flash process for the detected object is communicated to the apparatus via vehicle-to-vehicle communication in one or more environment synchronization messages.

7. The transportation vehicle of claim 5, wherein the apparatus further comprises a lighting apparatus that, in response to the detected object being a live animal or an object without an actuatable display unit or actuatable flashing light, causes visual emphasis of the detected object in response to the detected object being illuminated in a flashing or pulsating state by the lighting apparatus.

8. The transportation vehicle of claim 5, wherein the apparatus further comprises a flashing light and a communication module, wherein the computation unit environmentally synchronously highlights the object depicted in the observer transportation vehicle by sending one or more environment synchronization messages to the observer transportation vehicle, in which the computation unit communicates a flash rate or a phase of a flash process of the lighting or of the display unit of the object to the observer transportation vehicle.

9. A method for enhancing a field of view of a driver of a transportation vehicle with supplementary information, wherein the supplementary information is depicted via a display unit, wherein observation of surroundings of the transportation vehicle takes place and, in response to the observation of the surroundings having detected a relevant object having a potential significance, the relevant object is depicted on the display unit and a relation to a real object is emphasized in the field of view of the driver by the depicted object being visually highlighted by flashing in synchronization with a flashing element of the real object, wherein a previously computed trajectory for the relevant object is depicted on the display unit in connection with the depicted object, and wherein, in response to the relevant object being related to a transportation vehicle and the transportation vehicle using an activated flashing turn signal light to announce an intention to change lane, the depicted object is depicted in a flashing state, a flash process taking place in synchronization with the flash process of the real object.

10. The method of claim 9, wherein the previously computed trajectory is depicted in a synchronously flashing state, or, instead of the depicted object, the depicted trajectory of the object is depicted in a synchronously flashing state, or the depicted object and the depicted trajectory are depicted in alternately flashing states.

11. The method of claim 9, wherein one or more cameras or a RADAR or LIDAR sensor are used for the observation of the surroundings, and object detection is performed for recorded images.

12. The method of claim 11, wherein the object detection involves a number of images being evaluated to ascertain a flash rate for a detected flashing transportation vehicle.

13. The method of claim 9, wherein the depicted object is depicted in a differently pulsating or a differently emphasized state instead of completely in a flashing state.

14. The method of claim 9, wherein the different emphasis is that one or more of brightness, color, shape or size of the object changes in a pulsating state or that a symbol or a pictogram for the depicted object is depicted in a flashing or pulsating state.

15. The method of claim 14, wherein a flash rate or a phase of the flash process for the detected transportation vehicle is communicated to the transportation vehicle via a vehicle-to-vehicle communication in one or more environment synchronization messages.

16. The method of claim 9, wherein, in response to the detected object being a live animal or an object without an actuatable display unit or actuatable lighting or flashing light, the real object is visually emphasized by the object being illuminated in a flashing or pulsating state by a lighting device of the transportation vehicle.

* * * * *